US009728028B2

(12) United States Patent
Chemla et al.

(10) Patent No.: US 9,728,028 B2
(45) Date of Patent: Aug. 8, 2017

(54) SECURITY DEVICE, METHOD AND SYSTEM FOR FINANCIAL TRANSACTIONS, BASED ON THE IDENTIFICATION OF AN INDIVIDUAL USING A BIOMETRIC PROFILE AND A SMART CARD

(75) Inventors: Yves Chemla, Boulogne-Billancourt (FR); Christophe Richard, Paris (FR)

(73) Assignees: Yves Chemla, Boulogne-Billancour (FR); Christophe Richard, Paris (FR)

( * ) Notice: Subject to any disclaimer, the term of this patent is extended or adjusted under 35 U.S.C. 154(b) by 2373 days.

(21) Appl. No.: 11/908,034

(22) PCT Filed: Feb. 21, 2006

(86) PCT No.: PCT/FR2006/000382
§ 371 (c)(1),
(2), (4) Date: Jul. 25, 2008

(87) PCT Pub. No.: WO2006/095067
PCT Pub. Date: Sep. 14, 2006

(65) Prior Publication Data
US 2008/0282334 A1 Nov. 13, 2008

(30) Foreign Application Priority Data
Mar. 7, 2005 (FR) .................................. 05 02247

(51) Int. Cl.
*G06Q 20/40* (2012.01)
*G07F 7/10* (2006.01)
(Continued)

(52) U.S. Cl.
CPC ......... *G07F 7/1008* (2013.01); *G06Q 20/341* (2013.01); *G06Q 20/4014* (2013.01);
(Continued)

(58) Field of Classification Search
CPC .................... G06Q 20/40145; G06Q 20/34
(Continued)

(56) References Cited

U.S. PATENT DOCUMENTS 5,870,723 A * 2/1999 Pare et al. ....................... 705/39
6,256,737 B1 * 7/2001 Bianco ............... G07C 9/00158
713/186

(Continued)

FOREIGN PATENT DOCUMENTS

| EP | 1239629 | | 9/2002 |
| WO | 0108055 | * | 2/2001 |
| WO | 0127723 | | 4/2001 |

*Primary Examiner* — Steven Kim
(74) *Attorney, Agent, or Firm* — Young & Thompson

(57) ABSTRACT

The invention relates to an innovative device which is used to secure payments or transactions made with a smart card and to validate the identity of the smart card holder using a client/server biometric control operation, regardless of whether said payments or transactions are made directly at a point of sale or from a PC (personal computer or shared open-access computer) which is connected to the Internet or using a mobile telephone, a portable computer (also known as a laptop), a PDA (Personal Device Assistant) or any other mobile or fixed means that can connect to any telecommunication network and carry out a transaction involving the use of biometrics at the transaction generation point. The invention also relates to smart-card-holding employees of financial institutions who perform professional inter-bank transfers. The invention can also be used for the electronic transfer of funds between states, between groups of states, between groups of states and states and between international organizations and states. The invention has been designed in the form of a client/server-type system for authenticating the identity of a smart card holder, based on the use of the smart card and on the identification of the holder by means of biometric data which are stored on an (Continued)

extended memory smart card and compared with biometric data from an external, remote database that is secured and operated by the third-party authentication server or by the financial institution, but which, for reasons of security and performance, are not transferred over the telecommunication network.

15 Claims, 12 Drawing Sheets

(51) Int. Cl.
  *G06Q 20/34* (2012.01)
  *G07C 9/00* (2006.01)
  *H04L 9/32* (2006.01)
(52) U.S. Cl.
  CPC ... *G06Q 20/40145* (2013.01); *G07C 9/00087* (2013.01); *H04L 9/3231* (2013.01)
(58) Field of Classification Search
  USPC .......................................... 705/35–45, 64–79
  See application file for complete search history.

(56) References Cited

U.S. PATENT DOCUMENTS

| | | | |
|---|---|---|---|
| 6,310,966 B1* | 10/2001 | Dulude et al. | 382/115 |
| 6,655,585 B2* | 12/2003 | Shinn | 235/382 |
| 6,719,200 B1 | 4/2004 | Wiebe | |
| 6,880,084 B1* | 4/2005 | Brittenham | G06F 21/77 705/66 |
| 6,950,536 B2* | 9/2005 | Houvener | 382/116 |
| 6,990,471 B1* | 1/2006 | Rajaram | G06F 21/33 380/268 |
| 7,107,220 B2* | 9/2006 | Novack et al. | 704/273 |
| 7,181,017 B1* | 2/2007 | Nagel et al. | 380/282 |
| 7,207,058 B2* | 4/2007 | Barrett | G06F 21/33 705/51 |
| 7,314,165 B2* | 1/2008 | Bonalle et al. | 235/380 |
| 7,690,577 B2* | 4/2010 | Beenau | G06K 9/00 235/380 |
| 9,189,788 B1* | 11/2015 | Robinson | G06Q 20/40145 |
| 2002/0062291 A1 | 5/2002 | Zoka | |
| 2002/0138351 A1* | 9/2002 | Houvener et al. | 705/18 |
| 2005/0232471 A1* | 10/2005 | Baer | 382/115 |
| 2005/0240779 A1* | 10/2005 | Aull et al. | 713/186 |
| 2006/0076420 A1* | 4/2006 | Prevost | G06Q 20/341 235/492 |

* cited by examiner

SECURITY DEVICE, METHOD AND SYSTEM FOR FINANCIAL TRANSACTIONS, BASED ON THE IDENTIFICATION OF AN INDIVIDUAL USING A BIOMETRIC PROFILE AND A SMART CARD

CROSS-REFERENCE TO RELATED APPLICATIONS

The present application claims benefit of priority to and incorporates by reference French Application No. 0502247 filed Mar. 7, 2005 and PCT/FR2006/000382 filed Feb. 21, 2006.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION

Field of the Invention

The present invention relates to an innovative system and method for securing payments or transactions made with a smart card, and for validating the identity of the smart card holder using a client/server biometric control operation, regardless of whether these payments or transactions are made directly at the point of sale or from a PC (personal computer or shared open-access computer) connected to the Internet, or using a cell phone, a portable computer (also known as a laptop), a PDA (Personal Digital Assistant), or any other computer or mobile or fixed means that can connect via any telecommunication network and carry out a transaction involving biometrics from the point generating said transaction. The present invention also relates to smart-card-holding employees of financial institutions who perform professional inter-bank transfers. This invention can also be used for electronic funds transfers between countries, between groups of countries, between groups of countries and countries and between international organizations and countries.

The present invention is designed in the form of a client/server-type system for authenticating the identity of a smart card holder, dually based on the use of the smart card and, on the identification of the holder i) by means of biometric data stored on an extended memory smart card, and ii) by comparison with biometric data from an external, remote database that is secured and operated by the authentication third party or by the financial institution.

Description of Related Art

Nowadays, around the world, payments or transactions are normally made using a magnetic-stripe card, with the transaction slip that is issued requiring a signature as part of the act of purchasing. In some countries, the signature is replaced by a multiple-digit PIN code, which is compared with that resident in the smart card memory.

Given the very strong volume in growth worldwide of purchase transactions or financial transfers, involving cards with or without microprocessors as the medium, more and more payments or transactions can be subject to fraud, having some transactions not requiring a PIN code. Although the PIN code ensures better security than the signature alone on the purchase slip, it risks being cloned or stolen from its owner.

Also, at present, card holders, regardless of whether the cards are smart or not, are identified by their personal proof of identification (personal ID); it has been observed that numerous card frauds, whether the card is smart or otherwise, occur with the issue of multiple cards by different financial institutions to a single individual, without it being possible to correlate and verify his identity in the form in which it is supplied today to the issuing financial institutions. Among other things, these frauds are due to the use of false papers, identity cloning in all its forms, or even the simple physical theft of cards, smart or otherwise, blank or already assigned.

BRIEF SUMMARY OF THE INVENTION

The system and method according to the invention makes it possible to remedy these drawbacks and these frauds, by providing financial institutions with a reinforced and inviolable securing method for transactions performed using a smart card.

Nowadays, these systems are made possible by the increase in the memory size of the smart cards which has risen from a level of below 100 Kb to a level of above 512 Kb. This significant increase in the memory size of the smart cards will make it possible to include stored information or software developed in the Java® (Sun) or .net® (Microsoft) environment, or with any other available language within the cards' memory.

Furthermore, the provision of cards capable of being used on both a low-bit rate connection port—as used today—and on a compatible fast high-bit rate port, means that fast real-time interchanges can be conducted on these smart cards, and software, or stored information, can be read at high speed. The availability of the two telecommunication ports on the microprocessor will allow for the complete and gradual migration of the installed base of payment terminals without deadlocks or incompatibilities.

This available memory capacity will enable us, to both store graphical information with a high enough level of precision to be perfectly usable and, to embed software keys and computation algorithms, as well as to toughen such algorithms, keeping in line with the capabilities offered by new developments. It will be noted that the current and common size of smart card memories, as well as the unavailability of a fast high-bit rate communication port, did not allow such a process in the past.

The overall inventive system itself comprises a number of devices that are described below.

BRIEF DESCRIPTION OF THE SEVERAL VIEWS OF THE DRAWINGS

The novel features believed characteristic of the invention are set forth below. The invention itself however, as well as a preferred mode of use, further objects and advantages thereof, will best be understood by reference to the following detailed description of an illustrative embodiment when read in conjunction with the accompanying drawings, wherein.

DETAILED DESCRIPTION OF THE INVENTION

Figure 1:
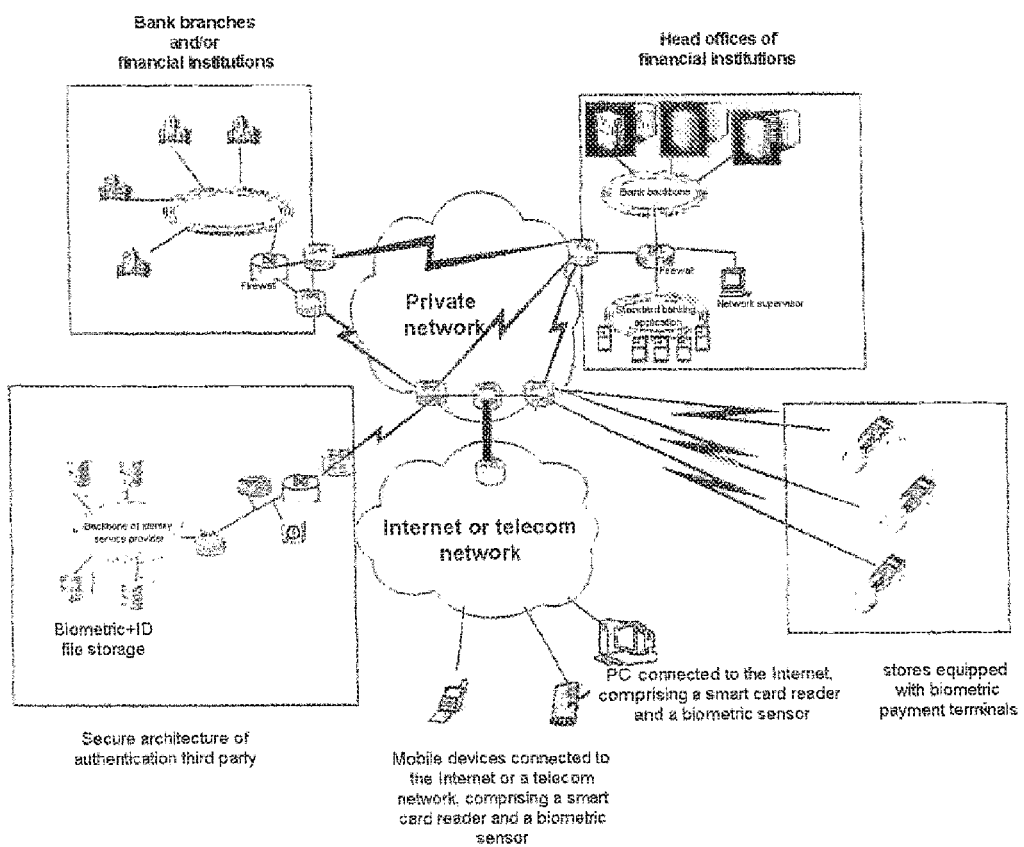
FIG. 1 represents the overall inventive system.

FIG. 1 represents the overall inventive system.

1.1 Storage format for the information on the smart card

Figure 2:
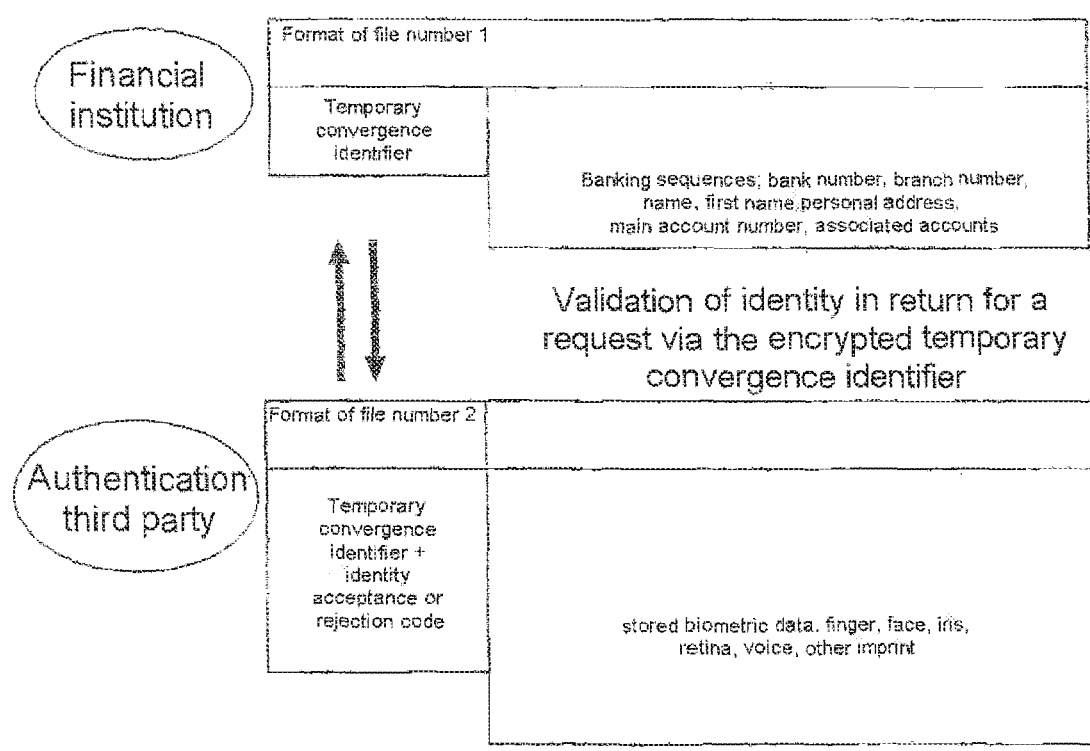
FIGS. 2 and 3 show the format of temporary request files and a request file format used for informing the biometric database.
Figure 3:
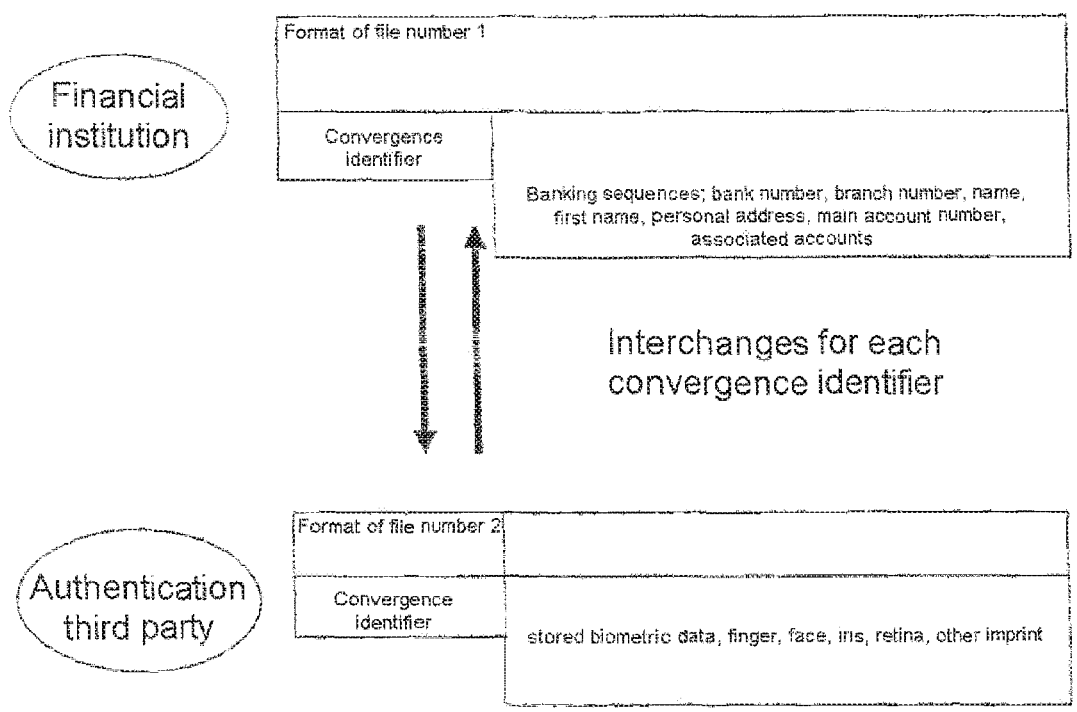

As illustrated by FIG. 1, the system according to the invention uses a personal smart card with microprocessor memory. The personal smart card is issued by the financial institution. Stored on the personal smart card is one or more encrypted biometric data items that are supplied by the card holder, and that are associated with a convergence identifier. The biometric data are encrypted before being stored in the microprocessor memory included in the smart card. See FIG. 2 showing a format of temporary request files with acceptance or rejection of the identity.

For any biometric imprint—fingertip, face, iris, retina, voice, or other—the software associated with the hardware (microcontroller associated with a flash memory, or equivalent device) will detect a group or series of critical points.

For reasons being more security-oriented than technical, the sensor will be programmed to select a greater or lesser number of points ranging from 5 to over 30. In practice, depending upon the computation power available in the terminal, which will evolve over time, and the time needed to perform the computations, and the transmission of the information resulting from these computations, the parameters will be modifiable. Each point will be described by coordinates on the sensor.

1.2 Process for informing the biometric database

With reference to FIG. 2, the invention provides a process for informing the biometric database and comprises issuing or refusing to issue as a result of false identity, identity cloning or identity theft. The identity check is based on the creation of two files.

The first file contains a sequence of the following type: convergence number, name, first name, national identity number, date of birth, banking institution, branch number, account number, and any other information needed in order to correctly use financial and banking services. Upon creation, the convergence identifier will be a temporary identifier, the final identifier being supplied only upon completion of the acknowledgement of the data validity by the authentication third party.

The second file contains a sequence of the following type: the final convergence number linked to the biometric information stored on the biometric database of the remote servers of the authentication third party.

For security reasons, a master server comprising the second file, that of the authentication third party, will be installed redundantly in the premises of the financial institution, and then can be used should the remote servers temporarily fail.

The authentication third party will have only an extract from the first file, in other words the convergence number, name, first name, national identity number, date of birth, banking institution, branch number. The account number will not be stored on the remote servers of the authentication third party.

Figure 5:
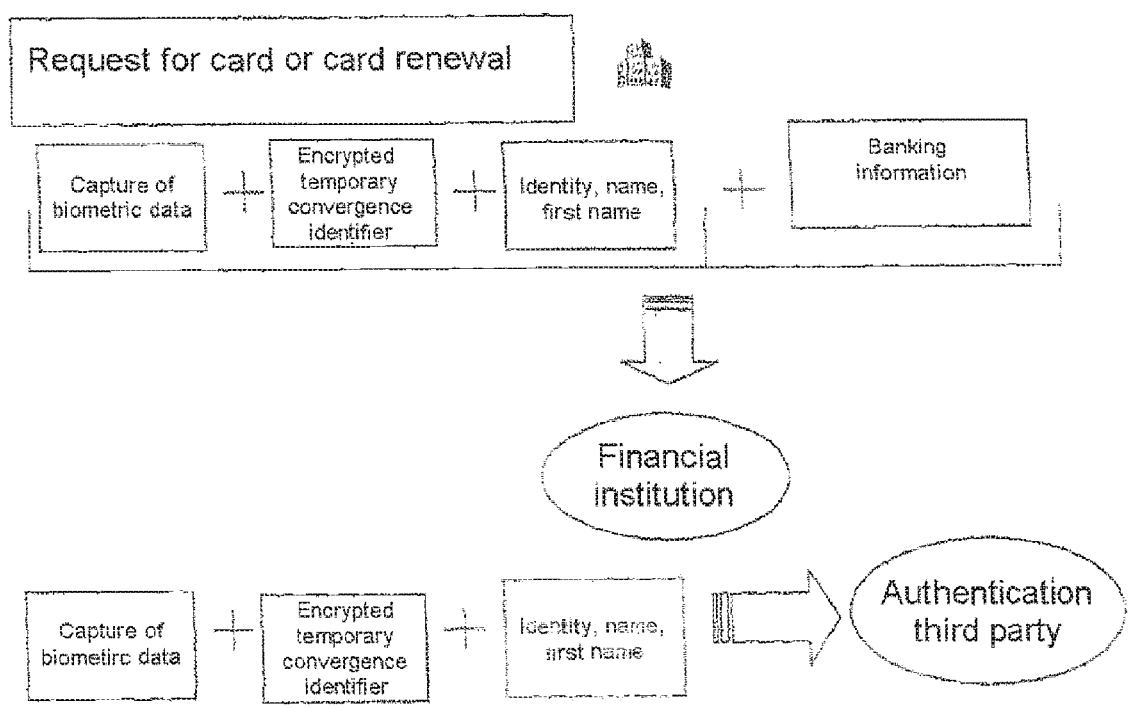

1.3 FIG. 5 shows transferring the encrypted temporary convergence identifier and the biometric data stored by the financial institutions to the remote servers of the authentication third party.

As shown in FIG. 5, for each individual requesting or holding a smart card, biometric data and personal identity data (name, first name, date of birth, etc.), collected by the financial institution, the transmission and the duplication on the server of the authentication third party or the remote servers. These data are transferred by the financial institution to the remote servers, and comprise a temporary identifier number generated by the software supplied by the authentication third party to the financial institution.

Once the data is stored, the system and method according to the invention performs a comparative analysis of the data supplied with the data existing on the database of the remote servers of the authentication third party, provided that these data already exist. A correlation will then be performed between the personal and biometric data in order to inform the financial institution as to the authentication of the individual.

Figure 6:
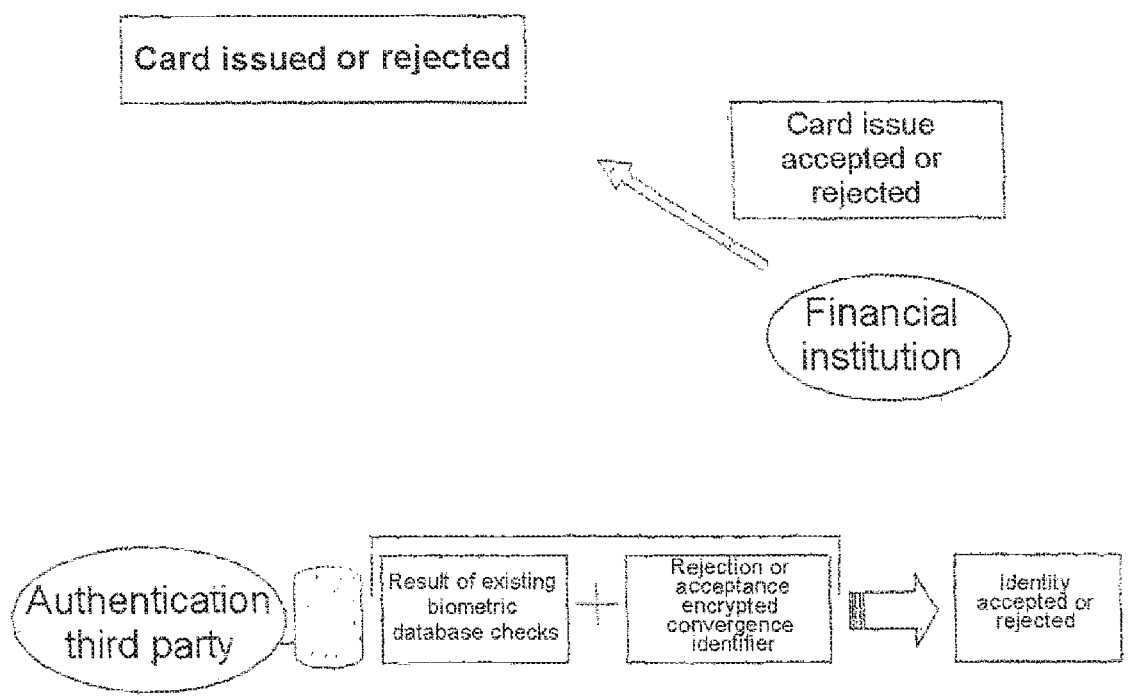

If an individual already exists with similar biometric data but different personal identity, the authentication will be rejected and flagged to the financial institution (FIG. 6). In return, the financial institution will receive the temporary identifier associated with a rejection code. This rejection code will immediately be interpreted by the software supplied by the authentication third party to the financial institution, and will recommend not issuing the card for reasons of identity cloning.

In the case where the individual is not already represented by his biometric and personal data on the remote servers of the authentication third party, his identity will be registered as valid. An identifier number will be generated. This identifier will be called convergence identifier. The temporary identifier issued by the financial institution will then be associated with the convergence identifier, and these two types of identifiers will be forwarded simultaneously to the requesting financial institution. The transmission of this data to the financial institution server will confirm the authentication of the individual for the issue of the smart card.

It will be noted that any one individual can have several different convergence identifiers, if he has requested bank cards from several different financial institutions, but can have only one convergence identifier for each financial institution. It will also be noted that if an individual raises several simultaneous requests to obtain smart cards within the same banking network (the same financial institution), as of the second request, the temporary identifier number, associated with a code flagged and recognized as a multiple requester, will be issued and transferred to the financial institution, and the decision of whether to issue a card or not will rest with the financial institution.

Since the authentication third party offers its services to multiple financial institutions, the system and method according to the invention will offer a greater level of security once the quantity of information collected is exhaustive.

Figure 4:
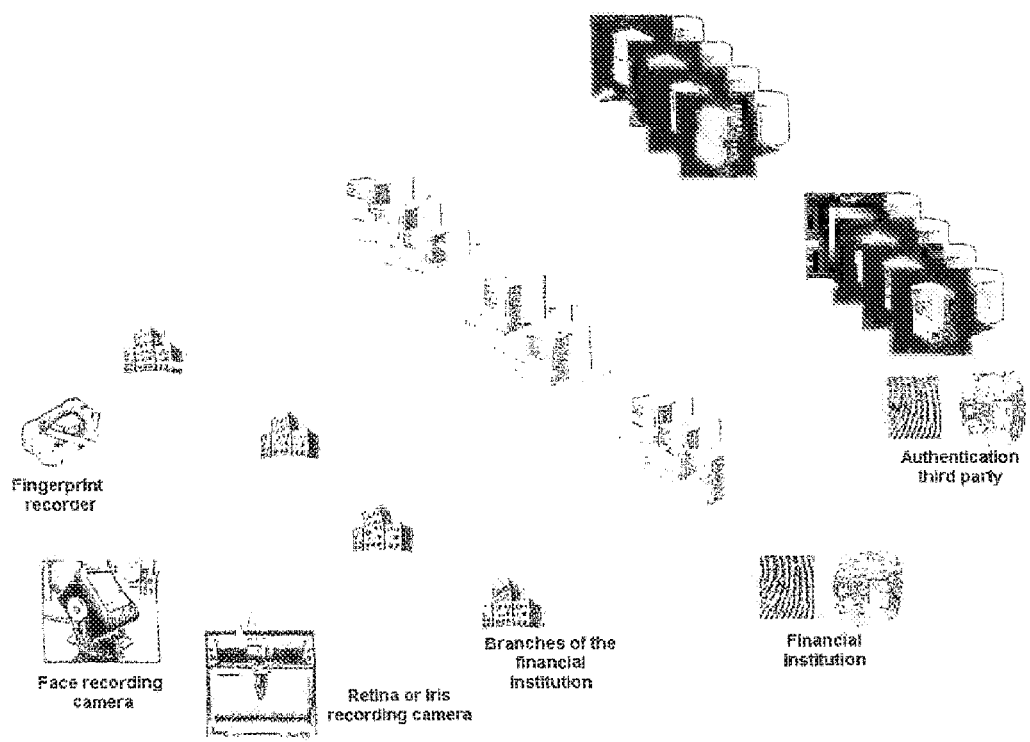
FIGS. 4, 5 and 6 represent the system elements, and a card issuing method for transferring biometric data stored by the financial institutions to the remote servers of the authentication third party.

FIGS. 4, 5 and 6 represent transferring biometric data stored by the financial institutions to the remote servers of the authentication third party.

Figure 7:
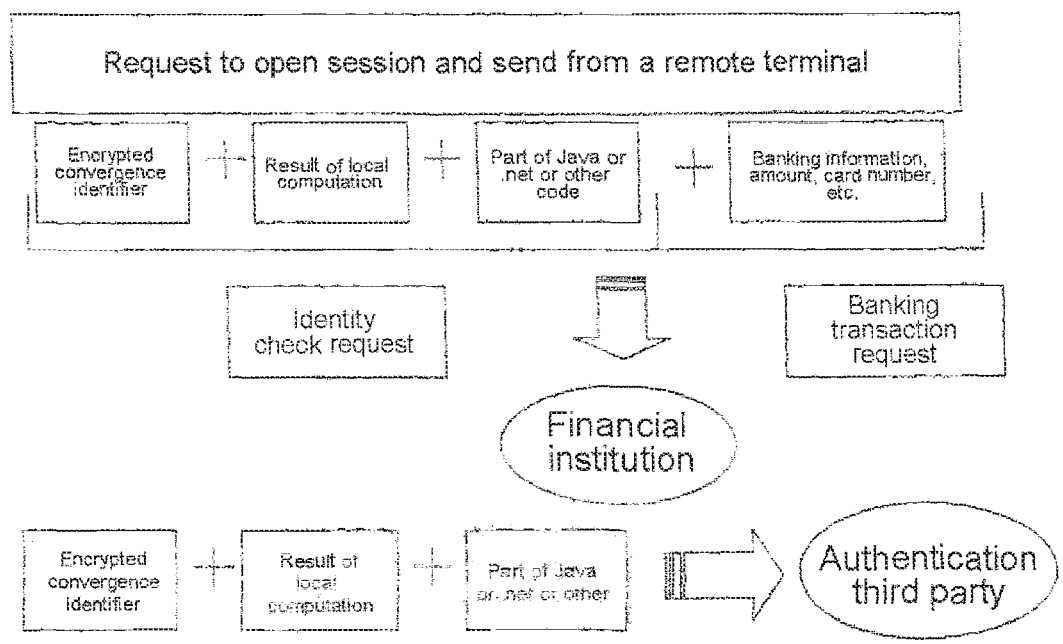
FIGS. 7 and 8 represent transaction and identity check requests with acceptance of rejection of a transaction for validating the identity of a smart card user at the time of a purchase at a point of sale or on the Internet.

1.4 Biometric authentication, as represented by FIG. 7, concerns the client/server procedure for validating the identity of a smart card user at the time of a purchase, or of a transaction, at a point of sale or on the Internet, or even using any other type of wired or wireless (GSM, UMTS, Bluetooth, WiFi or other) telecommunication network, or even by cell phone, by personal computer (also known as laptop), by PDA (Personal Digital Assistant) or other computer, or even using any other mobile or fixed equipment that can be connected via any telecommunication network, and perform a transaction involving biometrics from the point generating said transaction.

1.4.1 Innovative principle of biometric payment by smart card, at the time of a purchase or of a transaction, at a point of sale or on the Internet, or even using any other wired or wireless (GSM, UMTS, Bluetooth, WiFi, or other) telecommunication network, or even by cell phone, by portable computer (also known as laptop), by PDA (Personal Digital Assistant) or other computer, or even using any other mobile or fixed equipment that can be connected via any telecommunication network, and perform a transaction involving biometrics from the point generating said transaction.

The payment, or the transaction, is performed by using a smart card payment terminal at the point of sale, having, both, a local connection with a biometric imprint sensor, as well as, a microcontroller including/using a flash memory, or any other equivalent device, incorporated in the terminal. This microcontroller associated with a flash memory, or any other equivalent device, includes the original version of the software—integral part of the inventive system and method—which will perform the comparison computation against the selection of randomly chosen points, as described above.

Modalities of the software/microcontroller associated with flash memory process, or any other equivalent device or system:

I Capture of the biometric imprint,
II Reading of the identifiers,
III Sampling of the notable points, chosen randomly,
IV Algorithmic computation/calculation,
V Encryption of the results, sending the encrypted computation results and convergence identifier, the latter being associated with payment or transaction request, to the financial institution.

1.4.2 Software and hardware deployment:

A microcontroller associated with a flash memory, or any other equivalent device, containing the software image described above, will be incorporated in the point-of-sale terminal. It will be provided with an extended memory smart card reader, connected to a USB, or IEEE1394, or other equivalent type fast port, for the users wishing to make a payment or to conduct a transaction via a telecommunication network, of Internet or other type. Similarly, a software image could be incorporated in the personal computer or PC, in the cell phone, in the portable computer (also called laptop), in the PDA (Personal Digital Assistant) or other computer, or in any other mobile or fixed equipment that can be connected via any telecommunication network, and perform a transaction involving biometrics from the point generating said transaction, or even in any other tool using connectivity via a remote network and incorporating a biometric sensor, a computer, and a memory making it possible to store said software (volatile or non-volatile memory).

The algorithm will be supplied on a physical medium of CD or DVD Rom type, or downloadable, so that the user of a remote system can load it onto his machine.

Updates will be distributed at variable frequencies in order to be able to generate different algorithms, offering different computation results; these variants enable the manager of the identifiers to guarantee a very high level of security and quality concerning the validation of the identity of the people using this system.

In the same way, whether on the point-of-sale terminal or on the connected remote personal computer, or on any other connected device, the software version installed and available on each machine will be verified. On the point-of-sale terminal, or on the personal computer version, or even on any other connected device, a decision may be taken to perform a download to enable another authentication computation, if the version used at the time of the last preceding transaction is/becomes obsolete.

The personal computer or PC, the cell phone, the portable computer (also called laptop), the PDA (Personal Digital Assistant) or other device, or any other mobile or fixed equipment that can be connected by means of any telecommunication network, and capable of performing a transaction whereby biometrics is involved from the point generating said transaction, or any other device using connectivity via a remote network and incorporating a computer, and a memory enabling said software to be stored (volatile or non-volatile memory), must include one or more biometric sensors, either integrated or connected as peripheral devices.

1.4.3 Method and architecture concerning the authentication of the smart card holder:

At the point of sale, at the time of a purchase, a consumer will present his smart card, and he will be asked to place, for example, his fingertip on a biometric sensor.

The inventive device—based on a client/server architecture comprising hardware—a microcontroller associated with a flash memory or equivalent device—biometric sensors (fingertip, face, iris, retina, voice or other imprint) and original software programmed and stored on the smart card—takes charge of identifying the smart card holder.

The inventive device functions on a single-request architecture, comprising two parts, the first, a transaction request addressed to the financial institution, and the second, an identity validation request addressed to the servers of the authentication third party or the financial institution.

1.4.3.1. First Transaction and Identity Check Request

As shown in FIG. 7, the invention performs a correlation, in local mode, between the encrypted data stored on the smart card's microprocessor and the biometric data locally collected from the smart card holder. This is possible using original software developed according to the invention and incorporated in a microcontroller associated with a flash memory, or any other equivalent device, which is inserted into the terminal supporting the transaction.

The software and the microcontroller associated with a flash memory, or any other equivalent device, will incorporate management of the translation of the orthonormal matrix, in order to avoid the pitfalls of positioning on the sensor (it is possible, for example, to orient the fingertip a few degrees to the right or to the left relative to the theoretical axis of the sensor).

The positions of the points relative to the frame of reference (sensor matrix) and the relative positions of the points between themselves, as well as their vector orientation, will be the subject of an analysis which, initially, will be compared with the same computation as that which is available on the smart card itself.

This comparison will show an immediate correlation or its absence with the living imprint.

It will be noted that the imprint sensor will be of the thermometric or other type, in order to verify whether the subject is living or not, and that it is not an image copy of said imprint. The other sensor types will include an infra-red or other type verification, checking the temperature of the subject.

1.4.3.2. Second Transaction and Identity Check Request

Again, as illustrated in FIG. 7, the invention includes a correlation between the encrypted data resident on the remote servers of the authentication third party, using a local computation, the results of which are forwarded to the remote servers of the authentication third party, or of the financial institution, which performs the same computations and analyzes their results again. These results are accompanied by the encrypted convergence identifier, and the part of Java® (Sun) or .net® (Microsoft) code, or of any other available language, stored on the smart card, as well as information relating to the transaction itself.

The convergence identifier, the local computation results, the part of Java® (Sun) or .net® (Microsoft) code, or of any other available language, are forwarded in a single request, by the terminal, to the financial institution, which itself forwards to the authentication third party, or to the financial institution, the convergence identifier, the local computation results, the part of Java® (Sun) or .net® (Microsoft) code, or of any other available language, for an identity check.

While the results are being prepared by the authentication third party, the financial institution performs its own financial checks on the account of the smart card holder, pending acceptance or rejection of the identity of the smart card holder by the authentication third party, or by the financial institution itself. Once the acceptance or rejection of the identity of the smart card holder has been pronounced by the authentication third party, the financial institution terminates the transaction.

The identity checking operations are performed in real time.

The procedure will be strictly identical if the purchase is made via the Internet, or by any other means, or even via any other wired or wireless (GSM, UMTS, Bluetooth, WiFi or other) telecommunication network, or even by cell phone, by personal computer (also known as laptop), by PDA (Personal Digital Assistant) or other computer, or using any other mobile or fixed equipment that can be connected via any telecommunication network, and perform a transaction involving biometrics from the point generating said transaction.

Figure 8:
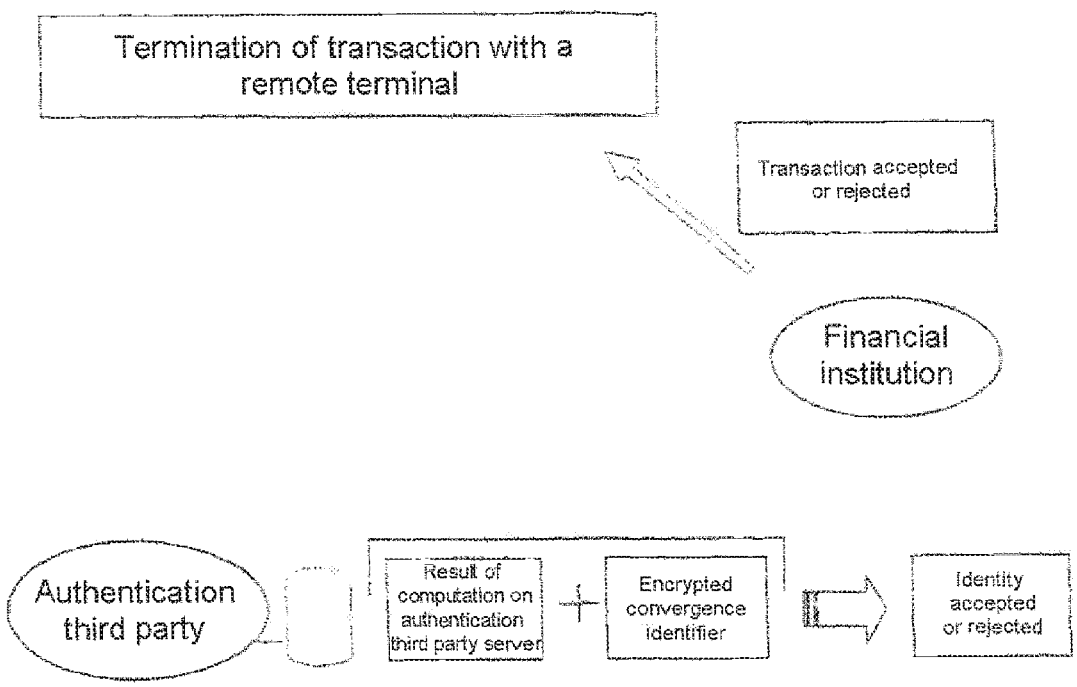
Figure 9:
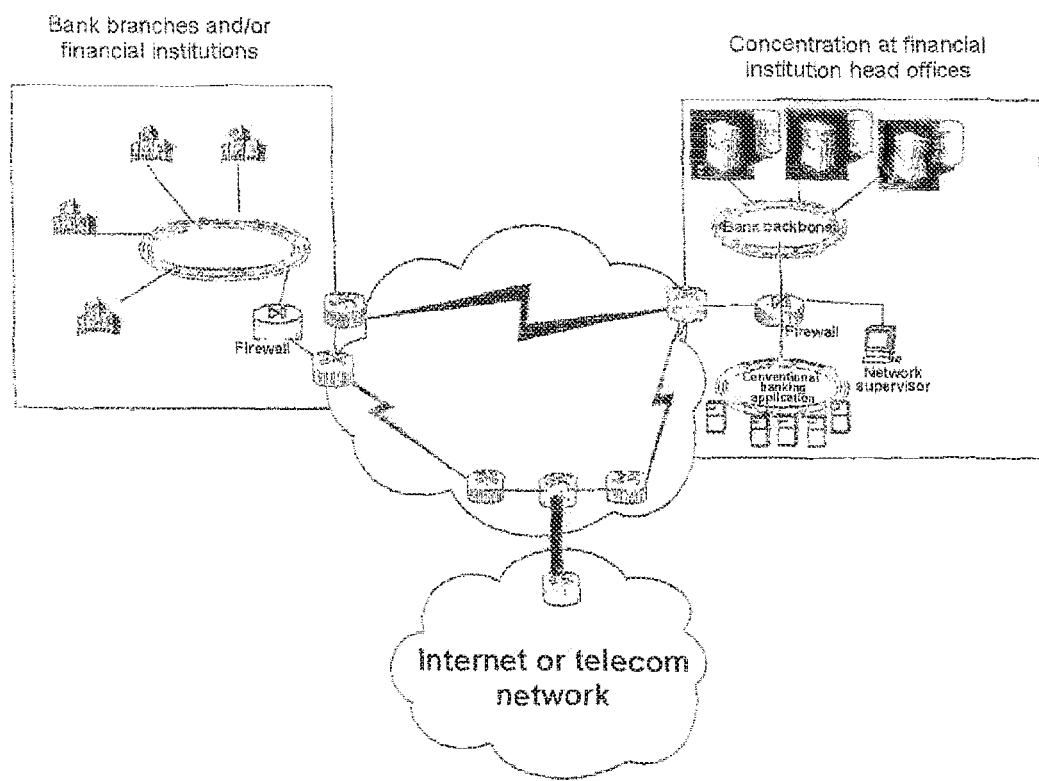
FIGS. 9, 10, 11 and 12 represent alternative arrangements for the transfer of biometric data, and transaction payment.

FIGS. 7 and 8 represent a client/server arrangement for validating the identity of a smart card user at the time of a purchase at a point of sale or on the Internet, or even via any other wired or wireless (GSM, UMTS, Bluetooth, WiFi or other) telecommunication network, or even by cell phone, by portable computer (also known as laptop), by PDA (Personal Digital Assistant) or other computer, or using any other mobile or fixed equipment that can be connected via any telecommunication network, and perform a transaction involving biometrics from the point generating said transaction.

Figure 10:
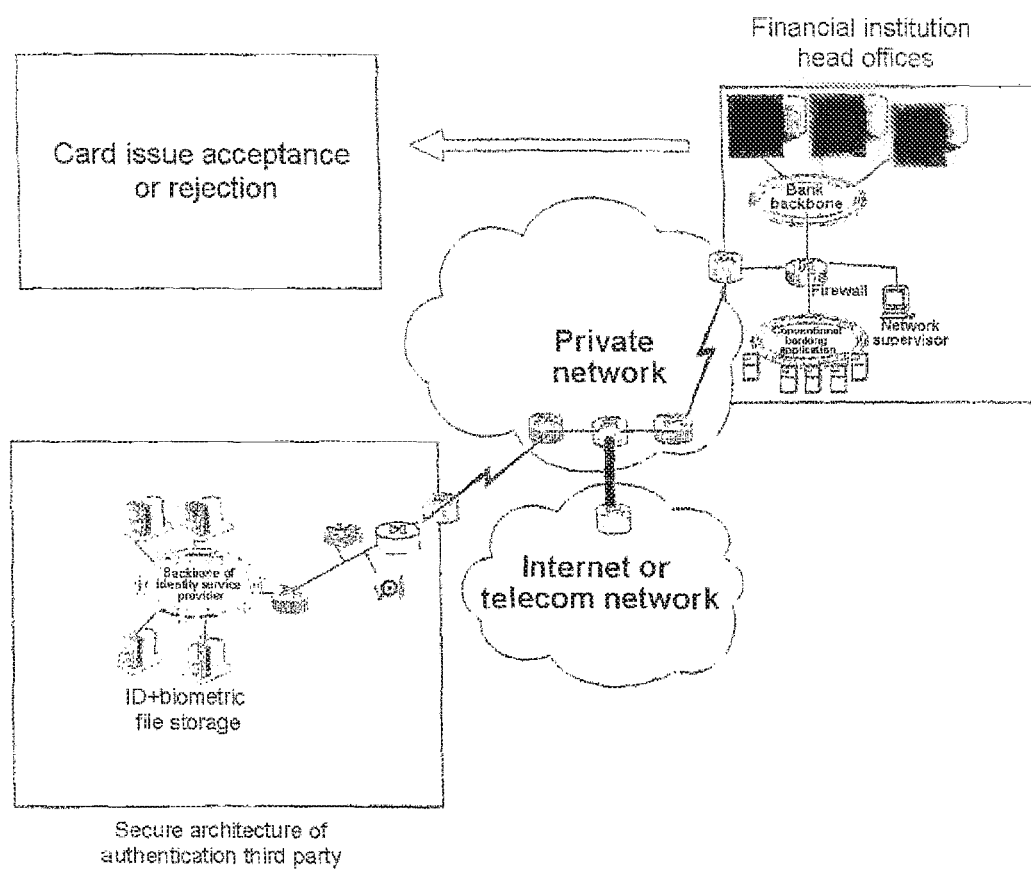

With reference to FIG. 10, steps of the authentication as explained.

Step 1: The financial institution receives a request to issue a smart card from a holder.

Step 2: The financial institution asks the future smart card holder to submit to having his biometric imprints captured.

Step 3: The biometric imprints are stored on the server of the bank branch, then transferred to the central server of the financial institution, with the data present on the branch server being deleted for security reasons.

Step 4: The biometric imprints are stored on the remote servers of the authentication third party.

Step 5: The financial institution asks for the identity to be validated by sending a request to the remote servers of the authentication third party.

Step 6: The preceding request is accepted, with no similar biometric imprint previously having been filed by the person requesting the issue of a smart card.

Step 7: The financial institution decides to issue the card in the name of the requesting person, and the biometric imprint or imprints supplied, the convergence identifier, the results of the local computation, the part of Java® (Sun) or .net® (Microsoft) code, or of any other available language, are stored on the microcontroller associated with a flash memory, or any other equivalent device, included in the smart card.

Step 8: The smart card holder goes to a point of sale and wants to purchase goods equal to a value of 100 euros.

Step 9: The holder's smart card is inserted into the payment terminal, and the holder is asked to place his fingertip, or any other part of the body, on or facing the appropriate biometric sensor, depending on the part of the body requiring validation.

Step 10: In local mode, the payment terminal validates the consistency of the two imprints, that of the card and that of the sensor.

Step 11: Having locally validated the consistency of the two imprints (the one stored on the smart card and the one that is the living part of the body), the payment terminal sends, in remote mode, a single request comprising two parts, one addressed to the financial institution and the other addressed to the servers of the authentication third party as illustrated in FIG. 7.

Step 12: The authentication third party in turn validates the consistency of the biometric identity of the smart card holder, and of the biometric identity stored on its servers; it then sends, in return, an identity validation or rejection code to the financial institution.

Figure 11:
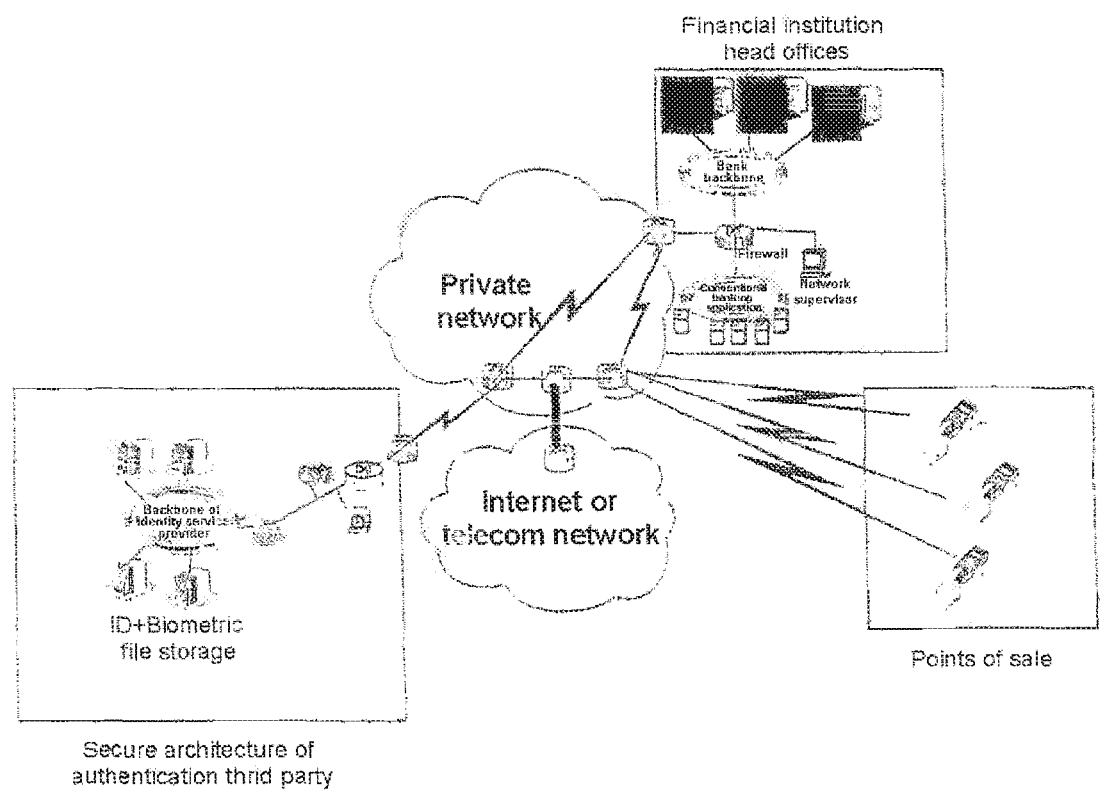

Step 13: The financial institution authorizes or refuses authorization of the 100-euro transaction, according to financial solvency data, by sending a positive or negative instruction to the payment terminal (FIG. 11).

Figure 12:
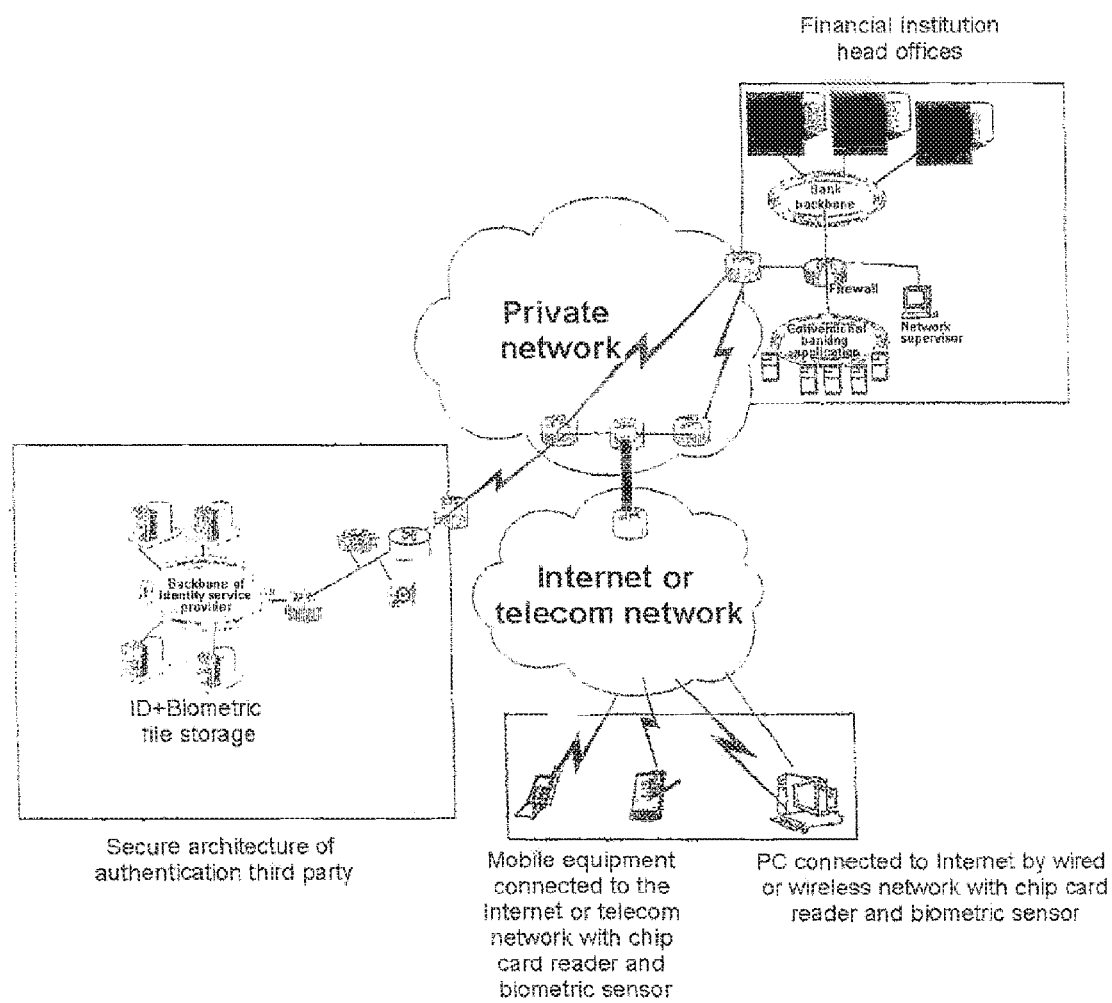

Similarly, the financial institution authorizes or refuses authorization of the 100-euro transaction, according to financial solvency data, by sending a positive or negative instruction to any one of the other types of terminals available on the market, such as the cell phone, the portable computer (also known as laptop), PDA (Personal Digital Assistant) or other, or any other mobile or fixed equipment that can be connected via any telecommunication network, and perform a transaction involving biometrics from the point generating said transaction (FIG. 12).

FIGS. 9, 10, 11 and 12 represent alternative arrangements of using the invention.

The invention claimed is:

1. A system that authenticates biometric data as part of a transaction authorization, said system comprising:
 a smart card of a user, the smart card comprising a microprocessor, the smart card storing encrypted biometric data of the user and a convergence identifier associated with the biometric data of the user, the smart card being associated with a financial institution;
 a communication network comprised of network devices;

a central server of the financial institution that stores i) financial information of the user, and ii) the convergence identifier of the user, the central server of the financial institution being connected to the communication network;

a remote server of an authentication third party operatively connected to the communication network, the remote server being a computer server that stores a biometric database of the authentication third party, the biometric database of the authentication third party including encrypted data of the biometric data of the user and the convergence identifier associated with the biometric data of the user; and a terminal operatively connected to the communication network, and via the communication network to the remote server of the authentication third party and the central server, the terminal comprising i) a microcontroller and an associated memory storing a computation algorithm, ii) a biometric sensor that reads a biometric data of the user of the smart card, and iii) a smart card reader that reads, from the smart card, the stored encrypted biometric data of the user and the stored convergence identifier associated with the biometric data of the user, wherein, the terminal is programmed to: a) perform a first validation of identity of the user by performing a first correlation between the encrypted biometric data of the user stored on the smart card and the biometric data of the user collected from the biometric sensor, b) based upon the validation of the user's identity, create a first file comprising the convergence identifier and information of a banking institution, and create a second file comprising the convergence identifier and the biometric data read by the biometric sensor wherein the convergence identifier and the biometric data are stored both on the smart card and on the remote server of the authentication third party, c) send a first request to the remote server of the authentication third party for identity validation of the user, the first request including the second file with the convergence identifier and the biometric data, d) send a second request to the central server of the financial institution for authorization to complete a financial transaction for the user, the second request including the first file with the convergence identifier and the information of the banking institution, and f) complete the financial transaction for the user based on the authorization from the central server of the financial institution, wherein the remote server of the authentication third party is programmed to: upon receiving the first request from the terminal, the remote server of the authentication third party, i) perform a second validation using the convergence identifier and the biometric data from the second file to perform a second correlation of the user's identity by performing a correlation between encrypted data of the biometric data of the user stored in the biometric database and encrypted data of the biometric data of the user in the remote server obtained from the second file, the biometric data stored in the database being linked to the convergence identifier, and ii) send an identity validation code to the central server of the financial institution based on the second validation, and wherein the central server of the financial institution is programmed to: upon receiving the identity validation code from the remote server of the authentication third party, the central server of the financial institution i) use the convergence identifier and the information of the banking institution from the first file in making a determination whether to issue the authorization to complete the financial transaction for the user, and ii) sends the authorization to the terminal based on the determination.

2. The system of claim 1, wherein, the terminal is configured such that, prior to creating the first file and the second file, the terminal:
forms a first imprint from the encrypted biometric data read from the smart card and a second imprint from the biometric data read by the biometric sensor,
locally validates consistency of the first and second imprints, and
after locally validating the consistency of the first and second imprints, creates the first file with the convergence identifier and the information of the banking institution and creates the second file with the convergence identifier and the biometric data.

3. The system of claim 1, wherein the central server of the financial institution also stores the biometric data of the user linked to the convergence identifier of the user.

4. The system of claim 1, further comprising communication or computer systems of a branch bank connected to the communication network, wherein the communication or computer systems of the branch bank of the financial institution comprises a biometric imprint capture device, a computer configured to i) generate a temporary identifier number, and ii) store the captured biometric data of the user and the temporary identifier number on the smart card of the user.

5. The system of claim 1, wherein the convergence identifier is a number.

6. The system of claim 1, wherein the convergence identifier is a computer-generated number.

7. The system of claim 1, further comprising:
communication or computer systems of a branch bank of the financial institution comprises means to capture biometric imprints of an applicant user, a computer that generates a temporary identifier number, and means that stores the captured biometric data of the applicant user and the temporary identifier number on the smart card of the applicant user,
wherein the remote server of the authentication third party further stores the temporary identifier number of the applicant user, the convergence identifier being generated subsequent to the authentication third party receiving the temporary identifier number, the convergence identifier being a computer-generated number,
the central server of the financial institution further stores the temporary identifier number in association with the biometric data of the applicant user.

8. The system of claim 7, wherein,
the communication or computer systems of the branch bank further is configured to replace the temporary identifier number on the smart card with a final convergence identifier generated by the authentication third party.

9. The system as claimed in claim 1, wherein,
the communication network is one of the group consisting of an Internet network, a wired telecommunications network and a wireless telecommunication network, and
the terminal comprises one of the group consisting of a cell phone, a portable computer, and a PDA.

10. The system as claimed in claim 1, wherein the smart card contains biometrics that identify the user as:
a person using smart card as a personal payment means, an employee authorized by said financial institution performing an inter-bank transfer or a transaction in the course of professional business, and an employee of the civil service or of an international organization performing electronic funds transfers between countries, between groups of countries, between groups of countries and countries and between international organizations and countries.

11. The system as claimed in claim 1, wherein the first file contains comprises the convergence identifier, a last name of the user, a national identity number of the user, a date of birth of the user, a banking institution of the user, a branch number of the banking institution of the user, an account number of the user upon creation.

12. The system as claimed in claim 1, wherein the terminal is a cell phone.

13. The system as claimed in claim 1, wherein the terminal is a portable computer.

14. The system as claimed in claim 1, wherein the terminal is a PDA.

15. The system as claimed in claim 1, wherein the first file contains comprises the convergence identifier, and at least one of the group consisting of a last name of the user, a national identity number of the user, a date of birth of the user, a banking institution of the user, a branch number of the banking institution of the user, and an account number of the user upon creation.

\* \* \* \* \*